(No Model.)  A. JACKSON.  2 Sheets—Sheet 1.
DENTAL PLUGGER.

No. 258,424.  Patented May 23, 1882.

Witnesses,
Geo. H. Strong
S. H. Nourse

Inventor
Andrew Jackson
By Dewey & Co.
Attorneys (No Model.) 2 Sheets—Sheet 2.

A. JACKSON.
DENTAL PLUGGER.

No. 258,424. Patented May 23, 1882.

Witnesses,
Geo. H. Strong.
S. H. Nourse.

Inventor,
Andrew Jackson
By Dewey & Co.
Attorney

UNITED STATES PATENT OFFICE.

ANDREW JACKSON, OF SAN FRANCISCO, CALIFORNIA.

DENTAL PLUGGER.

SPECIFICATION forming part of Letters Patent No. 258,424, dated May 23, 1882.

Application filed March 21, 1882. (No model.)

*To all whom it may concern:*

Be it known that I, ANDREW JACKSON, of San Francisco, county of San Francisco, State of California, have invented an Improved Universal Automatic Dental Plugger; and I hereby declare the following to be a full, clear, and exact description thereof.

My invention relates to that class of dental instruments, known as "pluggers," used in delivering a blow upon the gold when in process of filling a cavity in the tooth.

It consists mainly in the employment of a curved tube or tubes having a line of balls combined with a plugger-point, a hammer, and means for transmitting power to the hammer, and in details of construction, substantially as hereinafter more fully set forth.

The object of my invention is to provide an instrument of universal application in the process of plugging, efficacious in use, and adapted by its construction to conveniently reach and operate in all cavities, no matter how or where situated in the tooth.

The difficulty hitherto in the use of automatic plugging devices has been that it is inconvenient, if not wholly impossible, to reach certain cavities which, by reason of their position or the position of the tooth itself, are almost inaccessible. These are now reached by a bent instrument, upon the head of which the blow is delivered directly by hand. The automatic pluggers, on account of being straight, cannot be used for any except the most convenient cavities.

Figure 1:
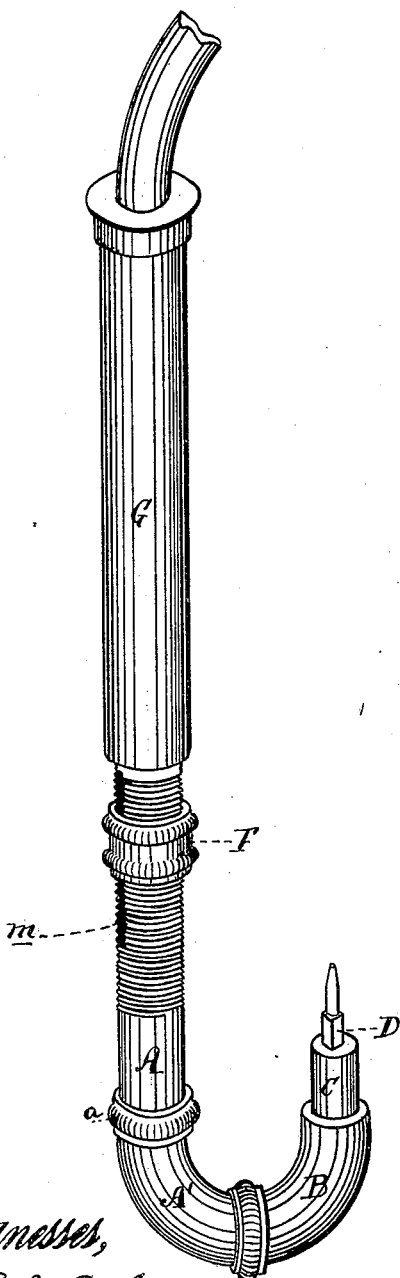
Figure 2:
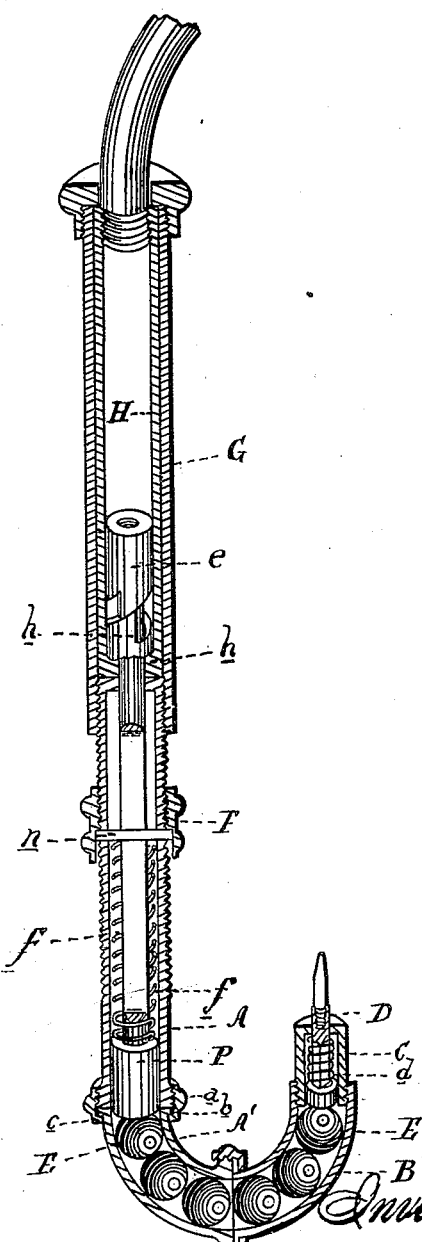
Figure 3:
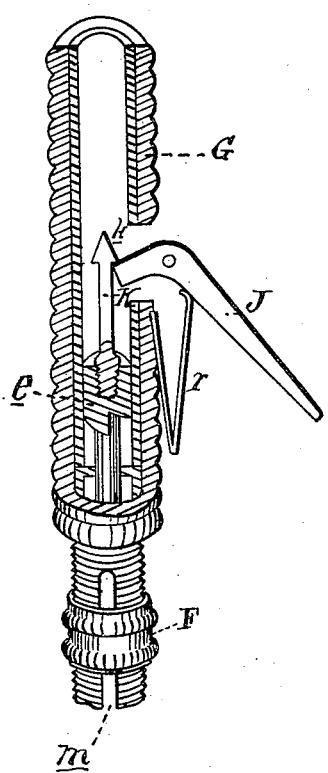
Figure 4:
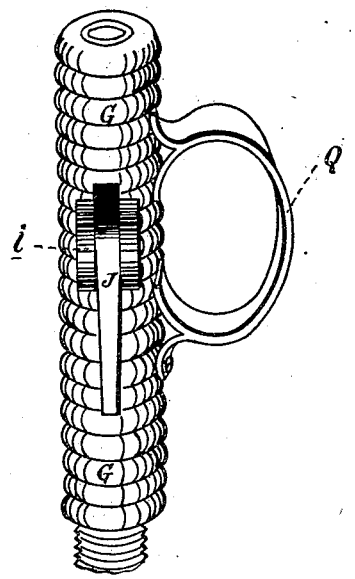

Referring to the accompanying drawings, Figure 1 is a perspective view of my device. Fig. 2 is a longitudinal section. Figs. 3 and 4 show modifications for hand-power.

Let A represent a tube forming at its forward end a joint with a curved tube, A'. These are united in such a manner that the tube A' may turn freely upon the tube A, and I have found that the following coupling accomplishes the object: The end of the tube A' is provided with a flange, b, and is passed through a coupling-ring, a, until its flange is stopped by a flange, c, in the ring a. The ring a is milled upon its outer surface for convenience in handling, and is screwed upon the end of tube A. When screwed up tightly it will draw the two tubes together, so that tube A' may be adjusted to another position and again fixed.

B represents a short tube, having a curvature similar to that of A', so that when fitted together to continue the curve the three tubes form one, the end of which is curved back upon itself. The tube B is so connected with tube A' as to be able to turn completely thereon, so that its end may be directed either backward, sidewise, or forward, or in any intermediate direction. The coupling between the two is similar to that which joins tubes A and A', and the tube B may therefore be caused to assume various directions and be fixed where desired.

Into the end of tube B is screwed a short, straight reducing-tube, C, having an opening in front, through which projects the tool-holder D, the end of which is tapped in a suitable manner for the reception of any of the usual and appropriate points or tools. The tool-holder D is preferably made square, that it may not turn when the point is being inserted. Around the tool-holder D is a spring, d, which returns said holder after the blow is delivered.

In the curved tubes B and A' are a number of balls or spheres, E. These may be made of any suitable material—such as steel, lead, ivory, or vulcanized rubber, for example—the material of which they are made depending upon the character of the blow to be delivered, or upon other reasons. Thus the steel balls will be used when a sharp, firm blow is to be given, and the lead balls will be used when what dentists term a "lead-blow" is wanted. These balls lie closely against each other, one end of the line impinging upon the head of the tool-holder D and the other against the end of a plunger, P, in the tube A. The function of this line of balls is to transmit power through the curved tubes A' and B, no matter in what direction they may be jointly or severally placed.

Around the shank or stem of the plunger P is a spiral spring, f, to deliver the blow, as hereinafter described.

Upon the end of tube A is screwed an inclosing or handle tube, G, within which is a tube, H, adapted to revolve therein. The rear end of the plunger P extends within the revolving tube H, and is provided with a spiral cam-head, e, against which a spiral cam-ring or flange, h, in the end of the revolving tube H, operates to force the plunger back and let it slip to deliver the blow by means of its spring f. The ordinary flexible tube through which power is transmitted from the foot, which is now used by dentists, is intended to be inserted within the pipe H for the purpose of revolving it. Thus the cam-ring h, impinging against the cam-head e of the plunger P, draws it back and allows it to slip when the spring f throws it forward. Power is transmitted from the end of the plunger to the balls E, and through them to the tool-holder D, and the blow delivered. The spring d returns the tool-holder.

In each side of the tube A are extended slots m. Around tube A is a ring, F, which is screwed thereon, and by its revolution moves forward or back upon said tube.

The spiral or stem of the plunger P is slotted, as shown, and a pin, n, passes through said slot, its ends extending through slots m in the tube A and engaging with the ring F, preferably by extending against a shoulder on the under surface of the ring. The milling with which said ring is provided is for convenience in turning.

The pin n passes through behind the operating-spring f, and forms the bearing for that end of said spring. By screwing the ring F to cause it to move forward or back upon the tube A the pin n is moved by and with it, and the tension of the spring may be regulated to deliver a hard blow or one of less force. This pin n also prevents the plunger from turning, which, by reason of friction, it would be liable to do.

Upon the inclosing or handle tube G is secured a thumb-socket guide or ring, Q, Fig. 4. This will allow the instrument to be grasped and held conveniently and securely.

I may readily adapt the device to be worked by hand-power by only a slight modification, as follows: The rear end of the cam-head e of the plunger is tapped and provided with screw-threads. In this socket is screwed a small rod, K, the rear end of which projects back into the handle and is provided with a beveled head, k. Upon the handle is a projection, i, to which is pivoted an elbow-lever, J. The lower arm of said lever extends downward through the handle-tube G in slots made therein and engages with the head k of rod K. Its other arm extends forward and is held up by a spring, r. When the lower arm of lever J is pressed down its short arm pushes back the rod K and the plunger P, to which it is attached. It then lets the rod K slip, and the plunger delivers its blow. The spring r then returns lever J to re-engage with rod K. This hand device may be adjusted without inconvenience by the removal of one handle with the revolving tube H and the substitution of the one just described.

It will be seen that by reason of the whole instrument being held in the hand, whereby it may be directed in a number of ways, and by reason of the curved tubes A′ and B, jointly or separately adjustable, the plugging tool or point may be directed in every possible way and the most inconvenient cavities reached. It can be used upon all sides of a tooth, and because of the line of balls power will be transmitted and the blow delivered in one direction as well as in another. In whatever direction delivered the blow will be a direct one. The instrument is first directed as well as may be with the hand, and by loosening the coupling-rings the tube A′ or tube B, or both, may be moved to the desired position and again tightened.

Although I have here described both curved tubes A′ and B as being adjustable, it is not absolutely necessary that this should be so. A good result is obtained by having the curved tool-carrying tube B only adjustable and the curved tube A′ made a part of tube A or rigid thereon. The movement of the hand, combined with that of tube B, will give almost every possible direction; but I deem the construction I have shown and described more preferable.

Having thus described my invention, what I claim as new, and desire to secure by Letters Patent, is—

1. In a dental plugger having a main or casing tube A, two or more curved tubes, one of which carries the plugging point or tool, said curved tube or tubes being coupled to the main tube and to each other so as to turn thereon either jointly or separately to change the direction of the plugging point or tool, and a means for transmitting power from its source through said curved tube or tubes to the plugging point or tool to cause it to deliver a blow, substantially as herein described.

2. In a dental plugger, the main tube A, with a curved forward end, A′, the curved tube B, carrying the plugging point or tool, said tube B being coupled to the curved end A′ and turning thereon to change the direction of the plugging point or tool and the line of balls or spheres E within the curved end A′ and the curved tube B for transmitting power from its source through said curved portions to the plugging point or tool to cause it to deliver a blow, substantially as herein described.

3. In a dental plugger, the main tube having curved jointed tubes, the line of transmitting-balls E, the plunger P and its stem, the spring f, pawl h, and cam e, substantially as and for the purpose set forth.

4. In a dental plugger, the combination and arrangement of the main tube A, adjustable curved tubes A′ and B, reducing-tube C, tool or point holder D, with its spring d, and the power-transmitting balls E, substantially as herein described.

5. In a dental plugger, the combination of curved tube, line of balls, a plugger-point, a hammer, and means for transmitting power to the hammer, substantially as and for the purpose set forth.

6. An automatic universal dental plugger consisting of the main tube A, adjustable curved tubes A' and B, reducing-tube C, tool or point holder D, with its spring $d$, power-transmitting balls E, plunger P, with its operating-spring $f$, and a means for drawing back said plunger and letting it slip to deliver its blow, substantially as herein described.

In witness whereof I hereto set my hand.

ANDREW JACKSON.

Witnesses:
C. D. COLE,
J. H. BLOOD.